United States Patent [19]

Kanaya

[11] Patent Number: 5,020,383
[45] Date of Patent: Jun. 4, 1991

[54] INTERMITTENT ROTATION DRIVE APPARATUS UTILIZING AIR PRESSURE

[75] Inventor: Shigeo Kanaya, Suita, Japan

[73] Assignee: Myotoku Ltd., Tokyo, Japan

[21] Appl. No.: 371,580

[22] PCT Filed: Oct. 27, 1988

[86] PCT No.: PCT/JP88/01091

§ 371 Date: Apr. 25, 1989

§ 102(e) Date: Apr. 25, 1989

[87] PCT Pub. No.: WO89/03948

PCT Pub. Date: May 5, 1989

[30] Foreign Application Priority Data

Oct. 27, 1987 [JP] Japan ............................ 62-163937
Jan. 20, 1988 [JP] Japan ............................ 63-5438

[51] Int. Cl.⁵ ............................................. F16H 31/00
[52] U.S. Cl. ...................................... 74/128; 74/148; 74/149
[58] Field of Search ............... 74/128, 149, 148, 160

[56] References Cited

U.S. PATENT DOCUMENTS 3,802,282  4/1974  Cook .................................. 74/128
4,350,054  9/1982  Werth, Jr. ........................... 74/160
4,403,523  9/1983  Seger ................................. 74/128
4,633,723  1/1987  Masovich et al. ................... 74/148

FOREIGN PATENT DOCUMENTS 976583  11/1964  European Pat. Off. .
1120805   7/1968  European Pat. Off. .
2230239  12/1974  France .............................. 74/128
46-36780  10/1971  Japan .
53-59172   5/1978  Japan .
55-109851  8/1980  Japan .
58-655     1/1983  Japan .
58-46241  10/1983  Japan .
 715379   2/1980  U.S.S.R. ............................ 74/128

Primary Examiner—Leslie A. Braun
Assistant Examiner—Scott Anchell
Attorney, Agent, or Firm—Armstrong, Nikaido, Marmelstein, Kubovcik & Murray

[57] ABSTRACT

Disclosed is an apparatus wherein the reciprocation of a piston which is achieved utilizing air pressure causes movement of a pawl portion provided on the piston, and this movement in turn causes intermittent rotation of a spindle. In particular, according to the present invention, a pair of pawl members are used, and a selector lever is provided to permit only one of the pawl members to cause the rotation of the spindle. When the pawl member to be actuated is thus selected through the action of the selector lever, selection can be made as to the direction of rotation of the spindle.

3 Claims, 4 Drawing Sheets

FIG.7 FIG.8 FIG.9
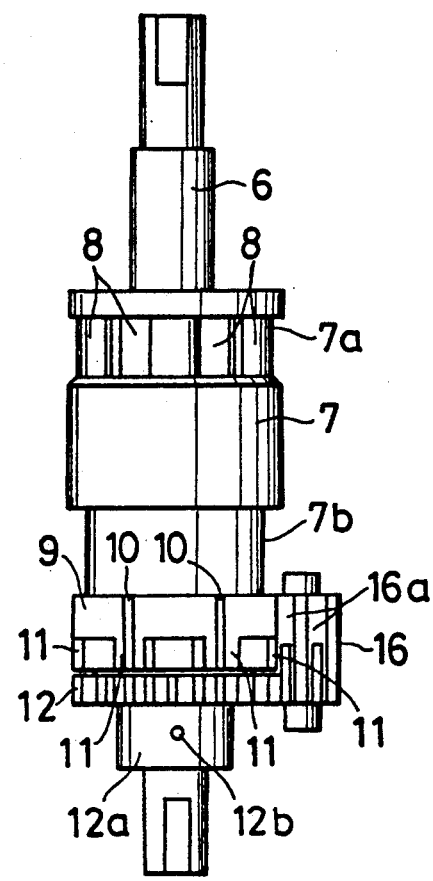
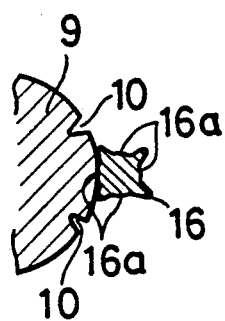
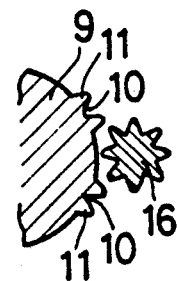
FIG.10
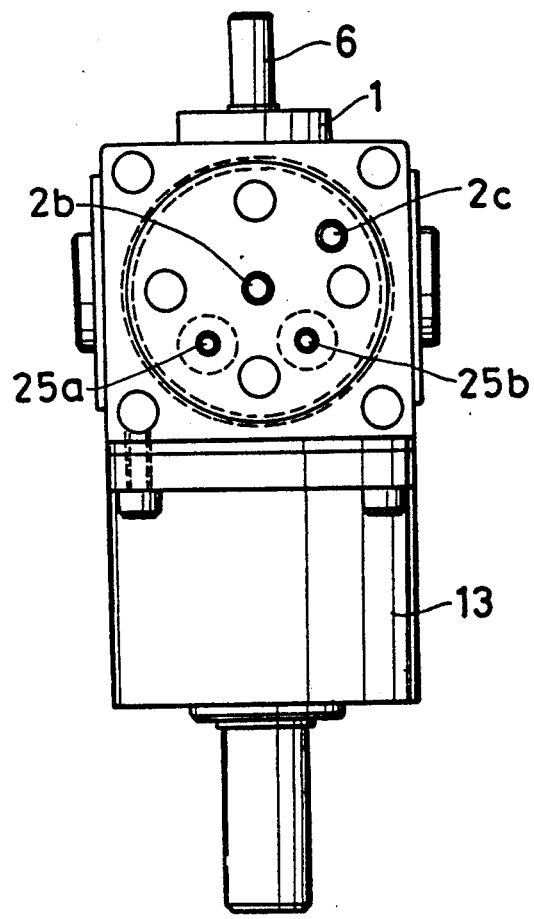

INTERMITTENT ROTATION DRIVE APPARATUS UTILIZING AIR PRESSURE

TECHNICAL FIELD

The present invention relates to intermittent rotation drive apparatus utilizing air pressure and, more specifically, to an intermittent rotation drive apparatus which utilizes air as the power source and employs a pawl-fed intermittent movement mechanism, and which is suitable for use in places where ordinary electric motors that utilize electricity cannot be used because explosives or combustibles are handled or because electromagnetic fields are present.

BACKGROUND ART

The so-called air motors have hitherto been provided as intermittent rotation drive apparatus which utilize air as the power source and employ a pawl-fed intermittent movement mechanism.

In general, such an intermittent rotation drive apparatus has a pawl member capable of moving linearly in response to air pressure so as to cause intermittent rotation of a gear-like rotary body.

An example of such intermittent rotation drive apparatus is known from Japanese Utility Model Publication No. 46241/1983 which discloses a stepping motor.

However, any of the conventionally provided intermittent rotation drive apparatus, such as that described above, is capable of causing, by the use of air pressure, intermittent rotation only in one direction. No apparatus has hitherto been provided that is capable of causing intermittent rotation in either of two directions.

In view of the foregoing, an object of the present invention is to provide an intermittent rotation drive apparatus utilizing air pressure which is provided with means for selecting the direction of rotation, and which thus is thus capable of allowing the direction of rotation to be freely selected.

DISCLOSURE OF INVENTION

The present invention provides an intermittent rotation drive apparatus utilizing air pressure comprising: a body receiving a piston capable of reciprocating within the body in response to air pressure; a hole formed in the piston and defined by a large mortise in the substantially central portion of the piston; a spindle extending through the hole; a roller housing mounted on the spindle in such a manner as to be rotatable relative thereto, the roller housing having a plurality of rollers disposed around the circumference thereof; a pair of pawl members pivotally supported by shafts fixed to the piston at positions at which the shafts extend in a direction normal to the direction of movement of the piston, the pawl members being adapted to feed the rollers by one pitch during the reciprocation of the piston, thereby causing rotation of the roller housing through a predetermined angle; and a selector lever capable of permitting the tip of only one of the pawl members to abut on the rollers. By virtue of this arrangement, therefore, when the selector lever is operated, one of the pawl members is selectively used, thereby enabling the rotary body to rotate in either of two directions.

The intermittent rotation drive apparatus utilizing air pressure according to the present invention may further comprise: a pair of single-action cylinders provided in correspondence with the pair of pawl members; and a pair of pushers capable of advancing and retracting in response to the action of the single-action cylinders, each of the pushers supporting one end of the selector lever, wherein when air pressure is selectively supplied to one of the single-action cylinders, the selector lever becomes slanted. With this arrangement, therefore, when the air pressure supplied to the pair of single-action cylinders is suitably controlled, the selector lever can be operated in such a manner as to make selection as to the direction of rotation. Thus, the direction of rotation can be controlled using the same power source as that provided for effecting intermittent rotation.

The intermittent rotation drive apparatus utilizing air pressure according to the present invention may further comprise: a rotor mounted on the spindle in such a manner as to be rotatable relative thereto and disposed in engagement with the roller housing, the rotor having vertical grooves and feed teeth formed in the outer peripheral surface thereof at vertically different positions; and a driven gear fixed to the spindle and engaging with the rotor via pinions each having non-toothed intervals formed in the upper part thereof. With this arrangement, therefore, it is possible to prevent the roller housing driven into intermittent rotation from rotating in the reverse direction due to any foreign load.

BRIEF DESCRIPTION OF THE DRAWINGS

FIG. 7 is a front view of essential parts including a spindle and parts coaxial therewith;

FIGS. 8 and 9 are views used to explain operation;

FIG. 10 is a front view showing a second embodiment;

BEST MODE FOR CARRYING OUT THE INVENTION

First Embodiment

Figure 1:
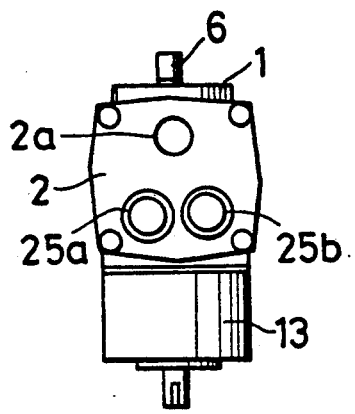
FIG. 1 is a front view showing a first embodiment as one preferred embodiment of the present invention.
Figure 2:
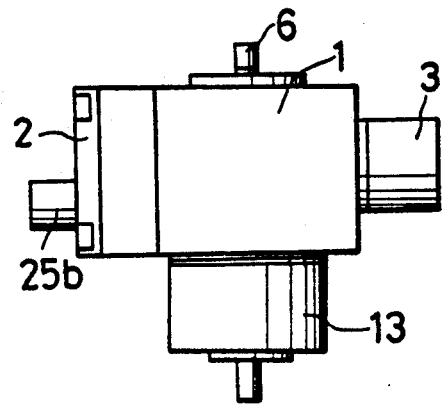
FIG. 2 is a side view of the embodiment shown in FIG. 1, taken from right side as viewed in FIG. 1.
Figure 3:
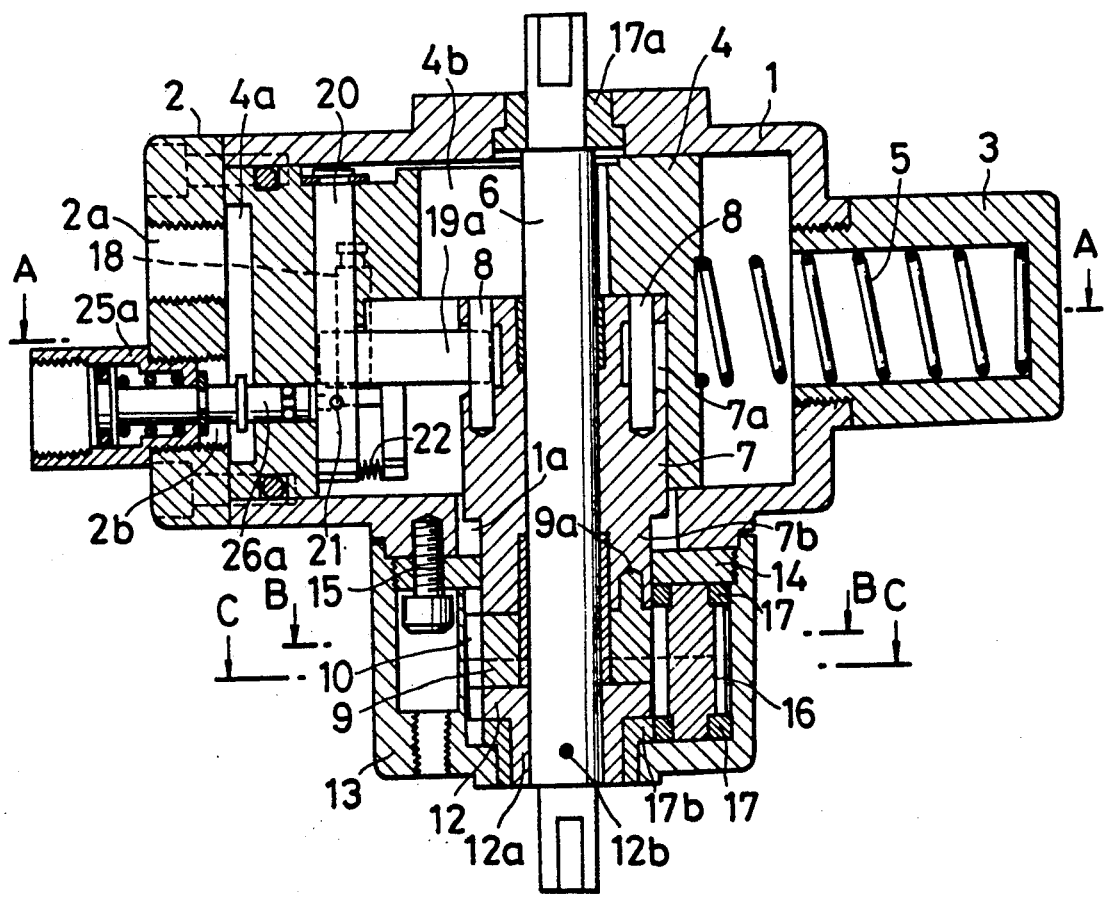
FIG. 3 is a right side view of a vertical section through the center of the embodiment shown in FIG. 1.

A first embodiment is shown in FIGS. 1 through 9.

In this embodiment, the apparatus has a body 1, and a front cover fixed to an open end of the body 1 by means of screws. The front cover 2 is formed with an inlet port 2a and a pair of openings 2b on which cylinders (described later) are mounted. A spring cylinder 3 is threaded into the rear wall of the body 1. A piston 4 is reciprocatively received in the body 1. A pressure-receiving recess 4a is formed in the front wall of the piston 4. The piston 4 normally presses against the front cover 2 by being urged by a return spring 5 received in the spring cylinder 3. When air pressure is intermittently supplied from an external system (not shown)

through the inlet port 2a into the pressure-receiving recess 4a, the piston 4 reciprocates to and fro.

A large mortise is formed in the substantially central portion of the piston 4 to define a hole 4b. A spindle 6 extends through the hole 4b. A roller housing 7, a rotor 9, and a driven gear 12 are successively positioned on the spindle 6. The roller housing 7 and the rotor 9 are rotatable relative to the spindle 6, while the driven gear 12 is fixed to the spindle 6 by means of pins 12b passed through a boss 12a of the gear 12.

Figure 5:
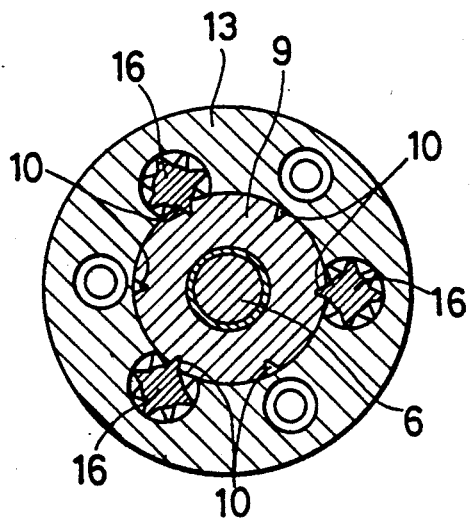
FIG. 5 is a view of a section along the line 5—5 shown in FIG. 3.
Figure 6:
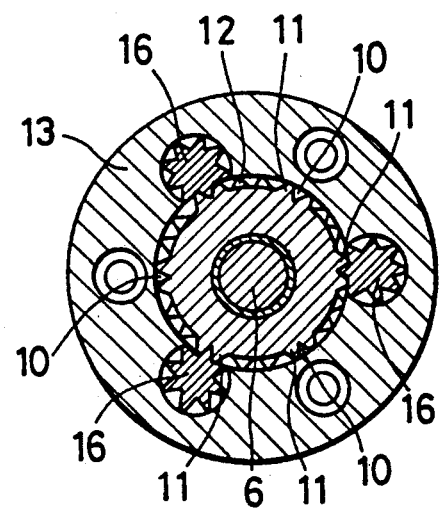
FIG. 6 is a view of a section along the line 6—6 shown in FIG. 3.
Figure 11:
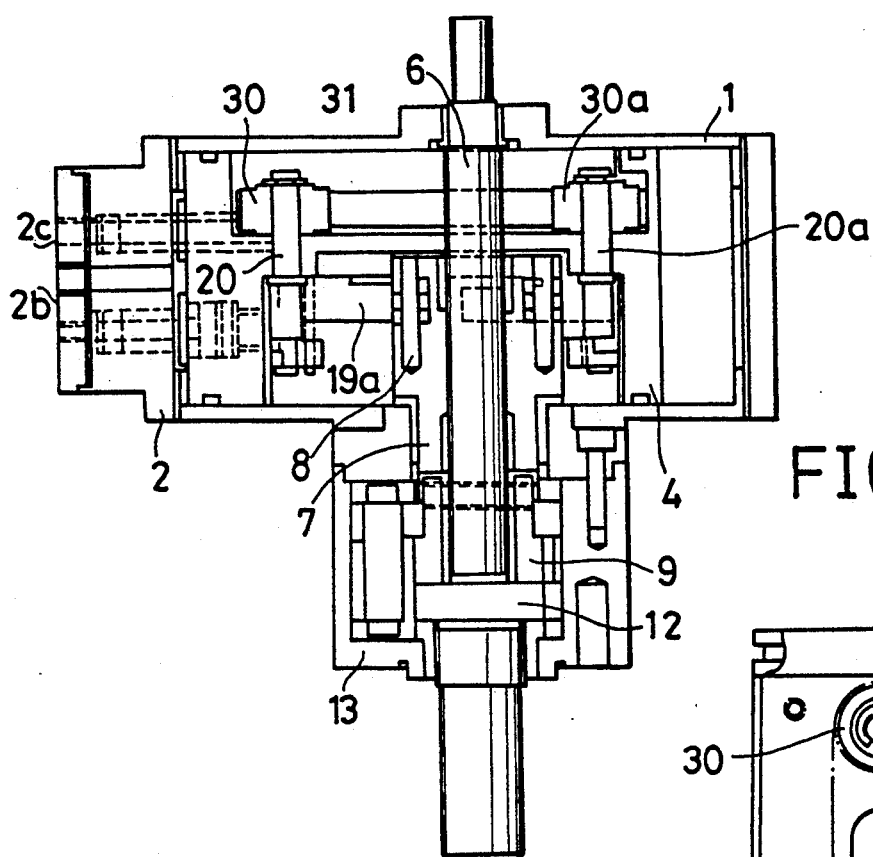
FIG. 11 is a view of a vertical section through the center of the shown in FIG. 10.
Figure 13:
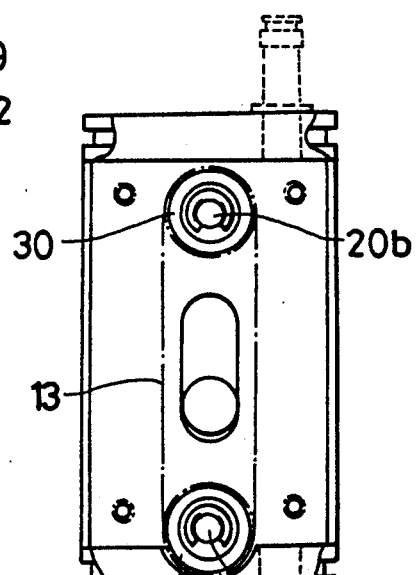
FIG. 13 is a partially sectioned view showing an arrangement for operating selector levers.
Figure 12:
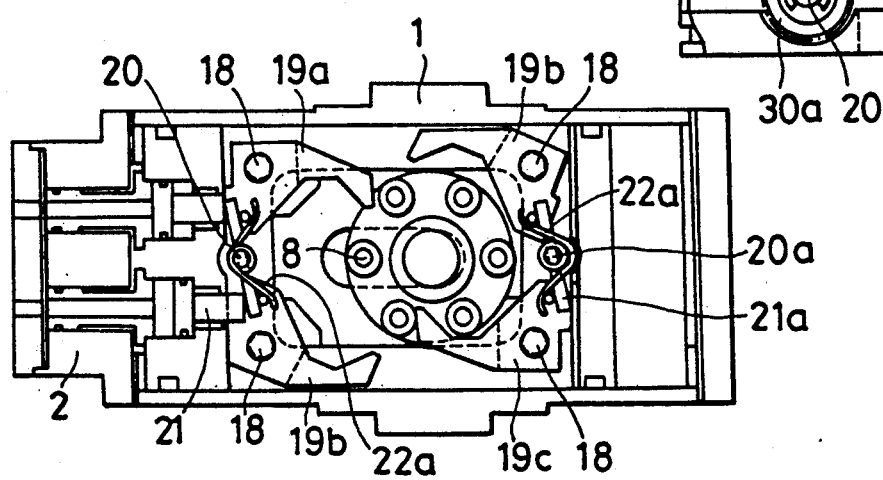
FIG. 12 is a view of a section of the embodiment shown in FIG. 10, taken on a plane normal to the plane of FIG. 11.

The roller housing 7 has an annular groove 7a formed in an upper portion of the outer periphery thereof. A plurality of rollers 8 (six rollers in the illustrated example) are held in and arranged in the annular groove 7a at equal intervals in the circumferential direction. A boss 7b at the lower portion of the housing 7 has small holes formed in the lower end thereof, and projections 9a of the rotor 9 are inserted in the small holes. In this way, the housing 7 and the rotor 9 are kept in mutual engagement and integrated. As shown in FIGS. 5 to 7, the rotor 9 has a plurality of (six, in the illustrated example) vertical grooves 10 formed at equal intervals in a smooth outer peripheral surface thereof. The rotor 9 also has, in the lower outer peripheral surface thereof, a plurality of pairs of feed teeth 11, each pair corresponding to each of the vertical grooves 10 and comprising two feed teeth 11 between which a part of the vertical groove 10 extends as their common bottom. The remaining outer peripheral surface of the rotor 9 is not toothed.

A lower portion of the roller housing 7, as well as the rotor 9 and the driven gear 12 which vertically follow the roller housing 7 project outwardly from a bottom hole 1a of the body 1. The opening of the bottom hole 1a is closed by a cover plate 14 fixed to the bottom plate of the body 1 by means of screws 15, whereby the roller housing 7 is prevented from being exposed to the outside. Also, the entire projecting portion is covered by an outer cylinder 13 in such a manner that only an end portion of the spindle 6 projects to the outside.

A plurality of pinions (three pinions in the illustrated example) 16 are provided in meshing engagement with the vertical grooves 10 of the rotor 9 and the driven gear 12. These pinions 16 are disposed in round mortises formed in the wall body of the outer cylinder 13 and are each rotatably supported by the outer cylinder 13 via upper and lower collars 17 which are coaxially fit on the pinion 16. As shown in FIG. 5, the pinions are disposed in such a manner that they come into meshing engagement with alternate ones of the vertical grooves 10 of the rotor 9. The upper part of each pinion 16 has non-toothed intervals 16a which alternate with teeth.

The upper end portion of the spindle 6 is rotatably supported by the upper wall of the body 1 through a sleeve 7a, and the lower end portion of the spindle 6 is rotatably supported by the outer cylinder 13 through the boss 12a of the driven gear 12 and another sleeve 17b.

A pair of vertical shafts 18 are positioned within the hole 4b of the piston 4 and fixed to the piston at positions at which the shafts 18 extend in a direction normal to the direction of movement of the piston 4. A pair of pawl members 19a and 19b are pivotally mounted on these vertical shafts 18, with the tip portions of the pawl members 19a and 19b facing rollers 8a and 8b, respectively. These rollers 8a and 8b are those, among the rollers 8 of the roller housing 7, which are positioned at the front on the right or left side.

A rotary shaft 20 supported by the piston is positioned midway between the vertical shafts 18 and is rotatably supported inside the hole 4b. A selector lever 21 is fixed, at an intermediate portion thereof, to the rotary shaft 20. Tension springs 22 extend between the pawl member 19a or 19b on one hand, and the rotary shaft 20 on the other. The pawl members 19a and 9b are provided with stopper pins 23 projecting therefrom. Both the pawl members 19a and 19b are always urged by the tension springs 22 in the direction in which they tend to close inwardly. However, since the stopper pins 23 always abut against the selector lever 21, the pawl members 19a and 9b are allowed to maintain their correct attitude with which these pawl members 19a and 19b have their tips facing the rollers 8a and 8b at the above-mentioned particular positions.

A pair of single-action cylinders 25a and 25b are mounted on the openings 2b of the front cover 2. Pushers 26a and 26b are associated with these cylinders 25a and 25b in such a manner as to be able to advance or retract by the action of the shafts of the single action cylinders 25a and 25b. The inward ends of the pushers 26a and 26b are disposed in contact with the two end portions of the selector lever 21.

Figure 4:
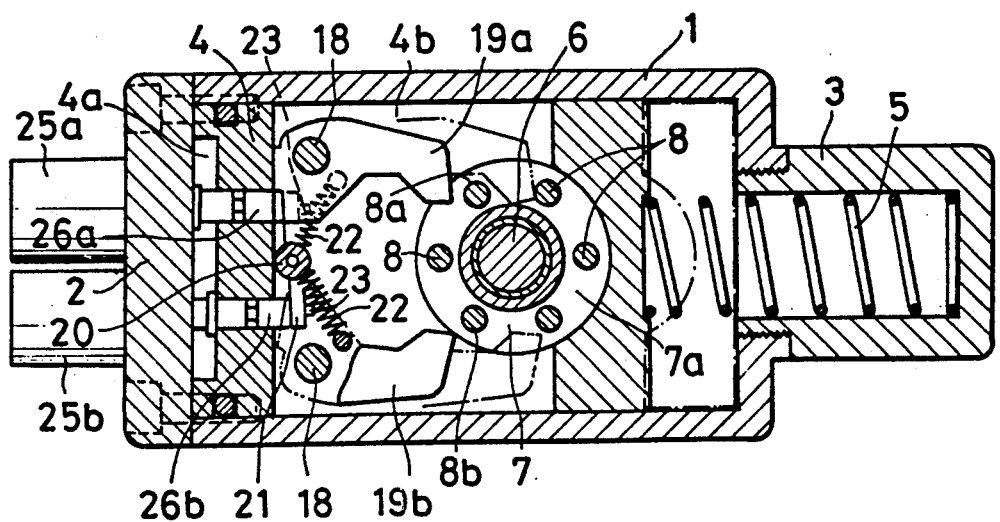
FIG. 4 is a view of a section along the line 4—4 shown in FIG. 3.

If, as shown in FIG. 4, air pressure is supplied to, for instance, the single-action cylinder 25b, this causes the shaft 25c of the cylinder 25b advance the pusher 26b, thereby causing the selector lever 21 to rotate, together with the rotary shaft 20, in the counterclockwise direction through a predetermined angle to become slanted As the selector lever 21 becomes slanted, it pushes the pawl member 19b via the stopper pin 23, thereby causing the pawl member 19b to rotate about the vertical shaft 18 to open outwardly. Consequently, the tip of the pawl member 19b becomes displaced from its position at which it faces the roller 8b. This condition is maintained while the piston 4 moves rightward as viewed in FIG. 4, or moves through its to-stroke, the pawl member 19a acts to send the roller 8a through one pitch, thereby causing a corresponding rotation of the roller housing 7 in the clockwise direction. Thereafter, the piston 4 moves leftward, or moves through its fro-stroke, by being urged by the return spring 5. During this movement, the pawl member 19a temporarily opens outwardly against the force of the tension spring 22 when its inner inclined surface comes into contact with a subsequent roller 8 which has newly moved to the position of the roller 8a, so as to pass this subsequent roller 8. Thereafter, the pawl 19a returns to its initial position.

On the other hand, if it is necessary to rotate the roller housing 7 in the counterclockwise direction, air pressure is supplied, to the other single-action cylinder 25a. Thereby the shaft of the cylinder 25a abuts against a flange 26c of the pusher 26a, advancing the pusher 26a, which causes the selector lever 21 to rotate in the clockwise direction to become slanted, whereby the pawl member 19a is opened outwardly, while the other pawl member 19b remains facing the roller 8b.

In this way, if air pressure is selectively supplied to one of the single-action cylinders 25a and 25b, the direction of rotation of the roller housing 7 and the spindle 6 can be freely changed in accordance with the selection.

The apparatus of the present invention which has the above-described arrangement effects the intermittent rotation of the spindle 6 in the following manner:

(1) Pulses of air pressure are supplied through the inlet port 2a, each time causing the reciprocation of the piston 4. During each reciprocation, the pawl member 19a or 19b sends one of the rollers 8 through one pitch, thereby causing the rotation of the roller housing 7 and the rotor 9 engaging therewith.

(2) During the rotation of the rotor 9, each time one pair of the feed teeth 11 passes the point of meshing engagement with one pinion 16, the pair of feed teeth 11 sends the pinion 16 by a distance corresponding to two teeth. In this way, the pinions 16 are driven into intermittent rotation The intermittent rotation of the pinions 16 is transmitted to the driven gear 12 which is in meshing engagement with the pinions 16, and to the spindle 6 to which the driven gear 12 is fixed. The spindle 6 which is thus driven into intermittent rotation can be used as the motive power shaft for machines and equipment applied in various fields (3) During the rotation of the rotor 9, when each pinion 16 is positioned between two adjacent pairs of feed teeth 11, as shown in FIG. 9, the addendums of the teeth of the upper part of the pinion 16 remain out of the vertical grooves 10, while one of the non-toothed intervals 16a of the pinion 16 is in contact with the outer periphery of the rotating rotor 9, as shown in FIG. 8. At this time, therefore, the rotation of the pinion 16 is prevented until the passage of a subsequent pair of feed teeth 11. Accordingly, the driven gear 12 which is in meshing engagement with the pinions 16 is prevented from rotating due to any foreign causes such as inertia, thereby making it possible to accurately drive the spindle 6 into intermittent rotation.

(4) If it is necessary to change the direction of rotation of the spindle 6, air pressure is selectively supplied to a different one out of the single-action cylinders 25a and 25b, whereby the slant of the selector lever 21 is changed in order to select a different one of the pair of pawl members 19a and 19b as the pawl member 19 to be brought into contact with the roller 8. In this way, a changeover of the direction of rotation of the spindle 6 can be effected even though the same single piston 4 is moved.

BEST MODE FOR CARRYING OUT THE INVENTION

Second Embodiment

The second embodiment is shown in FIGS. 10 through 13.

Since the second embodiment is basically the same as the first embodiment, descriptions of parts and components which are the same will be omitted, and the following descriptions will concern only those which are different.

The most significant difference of the second embodiment is that, in addition to the construction of the first embodiment, a second pair of vertical shafts 18 are provided in such a manner as to oppose, in the direction of movement of the piston 4, a pair of vertical shafts 18 which are the same as those of the first embodiment, so that two pairs of vertical shafts 18 are fixed to the piston and positioned within the hole 4b of the piston 4. Also, a further pair of pawl members 19c and 19d are combined with the second pair of vertical shafts 18.

The arrangement of the four pawl members 19a, 19b, 19c and 19d is such that two diagonally opposing pawl members 19a and 19c (or 19b and 19d) can come into contact with the corresponding ones of the rollers 8 during one reciprocation of the piston 4.

Specifically, when the piston 4 moves through its to-stroke, the pawl member 19a causes rotation of the rotor 9; and when the piston 4 moves through its fro stroke, the pawl member 19c causes rotation. In the second embodiment, therefore, rotation is effected at a speed which is two times that achievable in the first embodiment.

In the second embodiment, in order to bring the diagonally opposing pawl members 19a and 19c (or 19b and 19d) into contact with the corresponding rollers 8, another selector lever 21a and another rotary shaft 20a are provided in correspondence with the second pair of pawl members 19c and 19d. Also in the second embodiment, pulleys 30 and 30a are fixed to the rotary shafts 20 and 20a in such a manner as to be rotatable in the same direction via a belt 31 wound thereon.

With this arrangement, therefore, when air pressure is selectively supplied to one of the single-action cylinders 25a and 25b, the selector lever 21 is rotated together with the rotary shaft 20, and this rotation is transmitted via the belt 31 to the rotary shaft 20a to cause rotation of the shaft 20a as well. In this manner, the other selector lever 21a is simultaneously rotated.

Another difference of the second embodiment is that the tension springs 22 of the first embodiment are substituted by helical springs 22a in the second embodiment. However, this substitution causes no difference in the mechanism.

Further, the return spring 5 used in the first embodiment is omitted in the second embodiment. Instead, in contrast with the first arrangement where a single inlet port 2a is provided, the second embodiment includes two inlet ports, that is, a to-stroke inlet port 2b and a fro-stroke inlet port 2c. With this arrangement, therefore, a supply of air into the to-stroke inlet port 2b causes a corresponding rotation of the rotor 9, and a further supply of air into the fro-stroke inlet port 2c causes a further rotation of the rotor 9.

Industrial Applicability

As has been described above, the intermittent rotation drive apparatus utilizing air pressure in accordance with the present invention effects intermittent rotation by the use of air pressure alone and without requiring the use of electricity. This feature renders the apparatus suitable for use in such places as places where explosives or combustibles are handled or places where electromagnetic fields are present. In addition, since the apparatus is relatively small, it can be used in combination with various control equipments.

What is claimed is:

1. An intermittent rotation drive apparatus utilizing air pressure comprising:
   a body receiving a piston capable of reciprocating within said body in response to air pressure;
   hole formed in said piston and defined by a large mortise in a substantially central portion of said piston;
   a spindle extending through said hole;
   a roller housing mounted on said spindle in such a manner as to be rotatable relative thereto, said roller housing having a plurality of rollers disposed around the circumference thereof;
   a pair of pawl members pivotally supported by shafts fixed to said piston at positions at which said shafts extend in a direction normal to the direction of movement of said shafts extend in a direction normal to the direction of movement of said piston, said pawl members being adapted to feed said rollers by one pitch during the reciprocation of said piston, thereby causing rotation of said roller housing through a predetermined angle; and a selector lever supported by the piston and operable by air pressure so as to permit the tip of only one of said pawl members to abut on said rollers when said piston is reciprocated in response to air pressure.

2. An intermittent rotation drive apparatus utilizing air pressure according to claim 1, further comprising:

a pair of singleaction cylinders provided in correspondence with said pair of pawl members; and a pair of pushers capable of advancing and retracting in response to the action of said single-action cylinders, each of said pushers supporting one end of said selector lever, wherein when air pressure is selectively supplied to one of said single-action cylinders, a selected cylinder actuates a respective pusher to cause said selector lever to become slanted to displace a respective one of said pawl members away from said rollers.

3. An intermittent rotation drive apparatus utilizing air pressure according to claim 1 or 2, further comprising: a rotor mounted on said spindle in such a manner as to be rotatable relative thereto and disposed in engagement with said roller housing, said rotor having vertical grooves and feed teeth formed in the outer peripheral surface thereof at vertically different positions; and a driven gear fixed to said spindle and engaging with said rotor via pinions each having non-toothed intervals formed in an upper part thereof.

* * * * *